United States Patent [19]

Barnes

[11] Patent Number: 4,891,129
[45] Date of Patent: Jan. 2, 1990

[54] PROCESS FOR SOLIDS-FLUID SEPARATION EMPLOYING SWIRL FLOW

[75] Inventor: Peter H. Barnes, The Hague, Netherlands
[73] Assignee: Shell Oil Company, Houston, Tex.
[21] Appl. No.: 907,338
[22] Filed: Sep. 15, 1986
[30] Foreign Application Priority Data

Oct. 28, 1985 [GB] United Kingdom ............... 8526540

[51] Int. Cl.⁴ .......................................... C10G 11/18
[52] U.S. Cl. .................................. 208/161; 208/164; 208/153; 55/459 R; 55/447
[58] Field of Search ............... 208/161, 163, 164, 146, 208/153; 422/144; 55/345, 447, 459 R, 451

[56] References Cited

U.S. PATENT DOCUMENTS

| | | |
|---|---|---|
| 373,374 | 11/1887 | Morse . |
| 1,953,948 | 4/1934 | Bietn ................................. 55/459 |
| 2,223,652 | 12/1940 | White ................................ 183/110 |
| 2,372,514 | 3/1945 | Pootjes .............................. 209/144 |
| 2,399,509 | 4/1946 | Rich .................................. 183/34 |
| 2,511,387 | 6/1950 | Watson et al. ..................... 209/144 |
| 2,553,175 | 5/1951 | Davenport et al. ................. 183/83 |
| 2,667,944 | 2/1954 | Crites ................................ 183/81 |
| 2,718,491 | 9/1955 | Green ................................ 208/155 |
| 2,888,096 | 5/1959 | Evans ................................ 55/459 |
| 2,901,420 | 8/1959 | Evans ................................ 208/153 |
| 2,985,516 | 5/1961 | Trau et al. ......................... 23/288 |
| 3,137,133 | 6/1964 | Wilson et al. ...................... 60/39.02 |
| 3,672,502 | 6/1972 | Janich ............................... 209/144 |
| 3,710,558 | 5/1986 | Kam et al. ......................... 422/113 |
| 3,769,781 | 11/1973 | Klein et al. ........................ 55/261 |
| 3,802,164 | 4/1974 | Bowen ............................... 55/338 |
| 3,959,123 | 5/1976 | Wikdahl ............................. 209/211 |
| 4,148,721 | 4/1979 | Brown et al. ...................... 209/211 |
| 4,206,174 | 6/1980 | Heffley et al. ..................... 422/144 |
| 4,313,910 | 2/1982 | Dries et al. ........................ 422/147 |
| 4,378,234 | 3/1983 | Suzuki et al. ...................... 55/338 |
| 4,397,738 | 8/1983 | Kemp ................................ 208/101 |
| 4,404,095 | 9/1983 | Haddad et al. ..................... 208/161 |
| 4,426,212 | 1/1984 | Zacher .............................. 55/345 |
| 4,448,753 | 5/1984 | Gross et al. ........................ 422/144 |
| 4,455,220 | 6/1984 | Parker et al. ...................... 208/101 |
| 4,572,780 | 2/1986 | Owen et al. ....................... 208/157 X |
| 4,588,558 | 1/1973 | Feder ................................ 55/338 |
| 4,629,552 | 12/1986 | Haddad et al. ..................... 208/104 X |
| 4,666,674 | 5/1987 | Barnes .............................. 422/144 |

FOREIGN PATENT DOCUMENTS

| | | |
|---|---|---|
| 0222436 | 5/1987 | European Pat. Off. . |
| 851483 | 8/1952 | Fed. Rep. of Germany . |
| 875933 | 5/1953 | Fed. Rep. of Germany . |
| 1607746 | 11/1971 | Fed. Rep. of Germany . |
| 3009214 | 9/1981 | Fed. Rep. of Germany . |
| 51526 | 11/1966 | German Democratic Rep. . |
| 541472 | 8/1955 | Italy ................................. 55/459.1 |
| 671857 | 7/1979 | U.S.S.R. . |
| 1060-231-A | 12/1983 | U.S.S.R. . |
| 1150041 | 4/1985 | U.S.S.R. . |
| 568298 | 12/1941 | United Kingdom ............... 265/43 |

OTHER PUBLICATIONS

"Application of Mathematical Models and Computers for Optimizing and Controlling Suspension Separation Processses in Hydrocyclones,"V. V. Naidenko, Gorhii, Volgo-Vtyatskoe Publishing House, p. 108.
"Hydrodynamics of Hydrocyclones," A. M. Kutepov, I. G. Ternovskii, and A. A. Kuznetsov, Journal of Applied Chemistry of the USSR, vol. 53, No. 1., Part 1, Dec. 1980.

Primary Examiner—Glenn Caldarola

[57] ABSTRACT

An apparatus suitable for solids-fluid (e.g. cracking catalyst/hydrocarbon vapor) separation is disclosed having a plurality of substantially vertical tubular elements disposed within a housing. Inlet means are arranged in the bottom section of the housing and communicate with the space between the tubular elements and the housing. A plurality of tubular fluid outlet means are provided, the lower sections of which are arranged substantially coaxially within the upper sections of said tubular elements and define annular spaces therebetween in which swirl imparting means are arranged. The upper sections of the tubular fluid outlet means cooperate with opening(s) in the upper section of the housing, and the lower sections of the tubular elements communicating with solids outlet means. The invention further relates to a process for separating fluid cracking catalyst particles from gaseous hydrocarbon conversion products and/or flue gases using said apparatus.

6 Claims, 2 Drawing Sheets

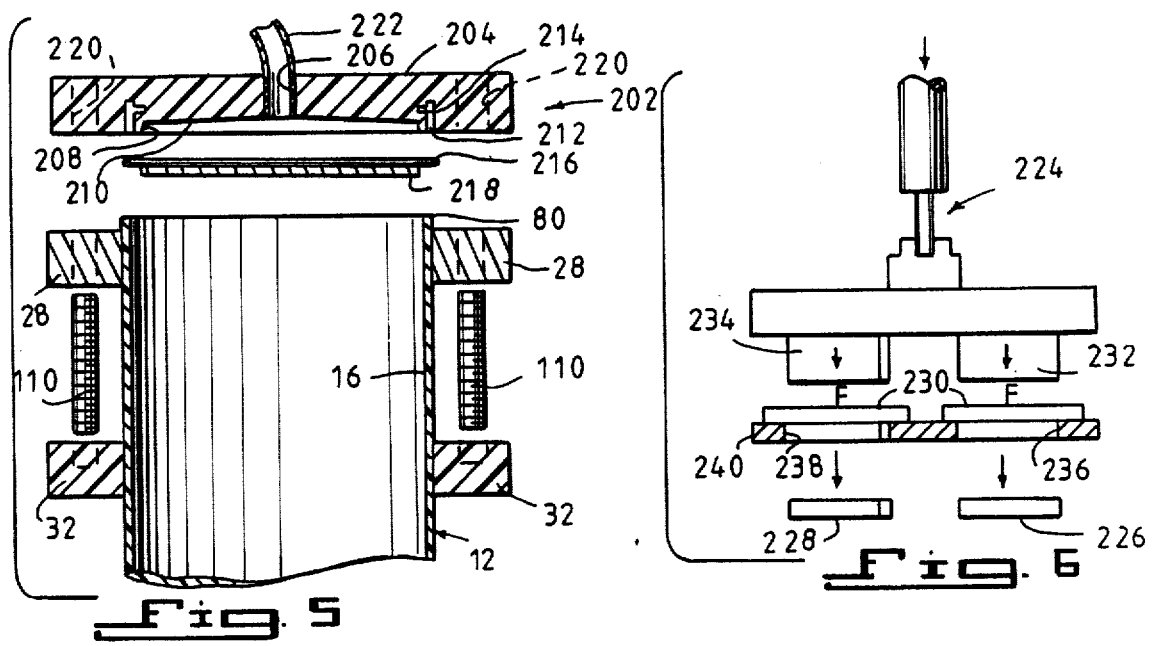
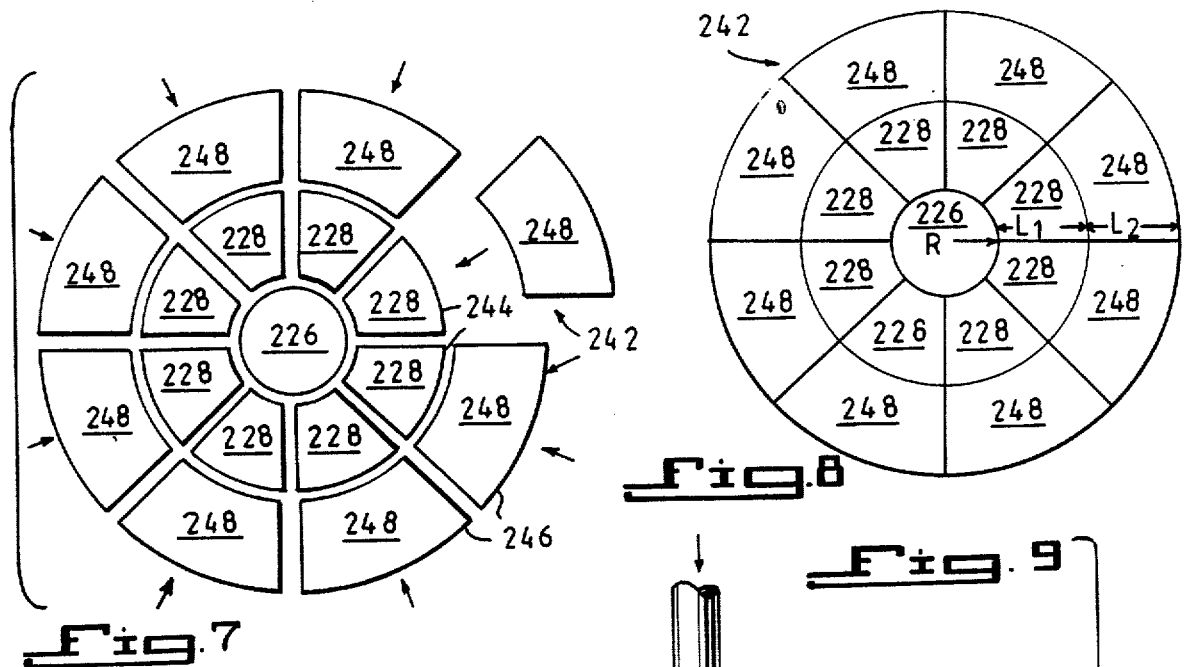
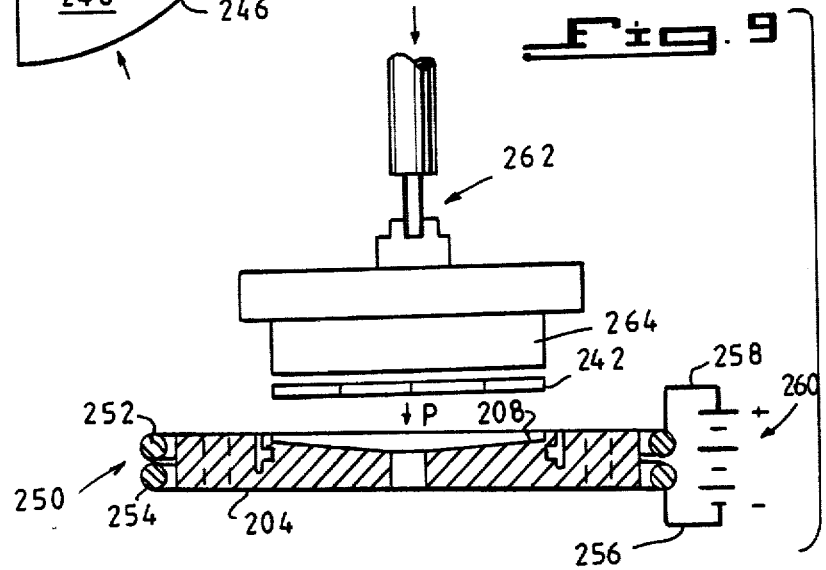

PROCESS FOR SOLIDS-FLUID SEPARATION EMPLOYING SWIRL FLOW

BACKGROUND OF THE INVENTION

The invention relates to an apparatus and a process for solids-fluid separation and to products obtained by such a process.

It is known to separate solids from gases by imparting a rotating movement to a solids-gas mixture which is entered substantially horizontally and tangentially in a vertical cylindrical body (e.g. a cyclone) from which gas is discharged at the top and solids are discharged from the bottom.

However, in order to attain substantially complete removal of small solid particles (e.g. catalyst fines) from gases, as desired in e.g. catalytic cracking processes, a number of cyclones is usually required even when the bulk of the solids has already been removed in a preceding separation stage (e.g. by means of deflection plates or cyclones). As a consequence of the horizontal feed inlet means extending tangentially from each cyclone body, a housing (e.g. a reactor vessel) having substantial dimensions would be needed to accommodate a number of cyclones.

Alternatively, such cyclones could be placed outside a reactor vessel, thus requiring complex bracing in order to withstand the prevailing pressure differentials at relatively high operating temperatures (e.g: 400°-600° C. inside the cyclones).

Moreover, in both cases undesired coke and hydrogen formation (i.e. after-cracking) may take place in the various dead spaces at said high temperatures during the substantial residence time in such a large apparatus of e.g. hydrocarbon-containing catalyst particles which are being separated from heavy hydrocarbon vapors.

It is further known to use cylindrical cyclones with axial downward entry for solids-gas separation. In conventional multiple cyclone designs, a solids-containing feed stream enters the cyclone assembly from one side horizontally or under a slight angle (e.g. less than 45 degrees) with a horizontal plane which, in the case that such an assembly arranged inside a reactor vessel, would require additional space as discussed hereinabove for cyclones with tangential feed entry. Moreover, such an arrangement would lead to a pressure difference between the cyclones near the feed inlet side and the downstream cyclones, which would cause unequal distribution of solids-containing fluid over the various cyclones.

It has now been found that the aforementioned disadvantages which are inherent to the various types of cyclones can be overcome by particularly arranging tubular elements and inlet- and outlet means in a housing, resulting in a very compact apparatus for a given solids-fluid separation capacity.

SUMMARY OF THE INVENTION

The invention therefore relates to an apparatus suitable for solids-fluid separation which comprises a plurality of substantially vertical tubular elements in a housing, inlet means arranged in the bottom of the housing and communicating with the space between the tubular elements and the housing, a plurality of tubular fluid outlet means, the lower sections of which are arranged substantially coaxially within the upper sections of said tubular elements to define annular spaces wherein swirl imparting means are arranged, and in which the upper sections of the fluid outlet means cooperate with opening(s) in the upper section of the housing, and a solids outlet means communicating with the lower sections of the tubular elements.

The apparatus according to the invention can be employed in processes wherein solids have to be separated from fluids (in particular gases at elevated temperatures and pressures) such as catalytic cracking, shale conversion processes and coal- or heavy oil gasification.

An advantage of the apparatus according to the invention is the relatively short residence time of the solids and fluids to be separated. This is of particular importance when the apparatus is applied in a fluid catalytic cracking process for separation of catalyst (fines) from hydrocarbon vapors where after-cracking of hydrocarbons (and thus carbon-formation on the catalyst particles) will be reduced as a consequence of short residence times, resulting in better product yields and less catalyst deactivation. Moreover, the spread in residence times will be relatively narrow, which leads to the production of less undesired products and a longer catalyst life, in comparison with the use of separation apparatuses in which the residence time spread is relatively wide.

Furthermore, the apparatus according to the present invention is very efficient in separating relatively small solid particles in relatively small amounts from gases in which said particles are present due to the symmetrical flow pattern in the apparatus which results in substantially equal loading of each tubular element. Therefore, the amount of solids carry-over into the separated gases will be very small, which makes it possible to eliminate recycle of slurry oil (e.g. catalyst fines in liquid hydrocarbons) from a downstream hydrocarbon fractionator to the cracking reactor in a fluid catalytic cracking operation, thus again improving product yields.

Preferably, the inlet means (through which a mixture of solids and fluid enters the apparatus) is (are) centrally located in the bottom of the housing below the tubular elements, in order to ensure optimal distribution of the upwardly flowing solids-fluid mixture over all tubular elements in which, to a large extent, the actual separation takes place.

BRIEF DESCRIPTION OF THE DRAWINGS

Various embodiments of the apparatus according to the invention are described hereinafter, using FIGS. 1-4 in which:

FIG. 2 is a longitudinal cross-sectional view of an integrated apparatus constructed in accordance with the present invention;

FIG. 4 is a cross sectional view of the integrated apparatus of FIG. 2 taken at line 4—4 of FIG. 2.

DESCRIPTION OF THE PREFERRED EMBODIMENTS

Figure 1:
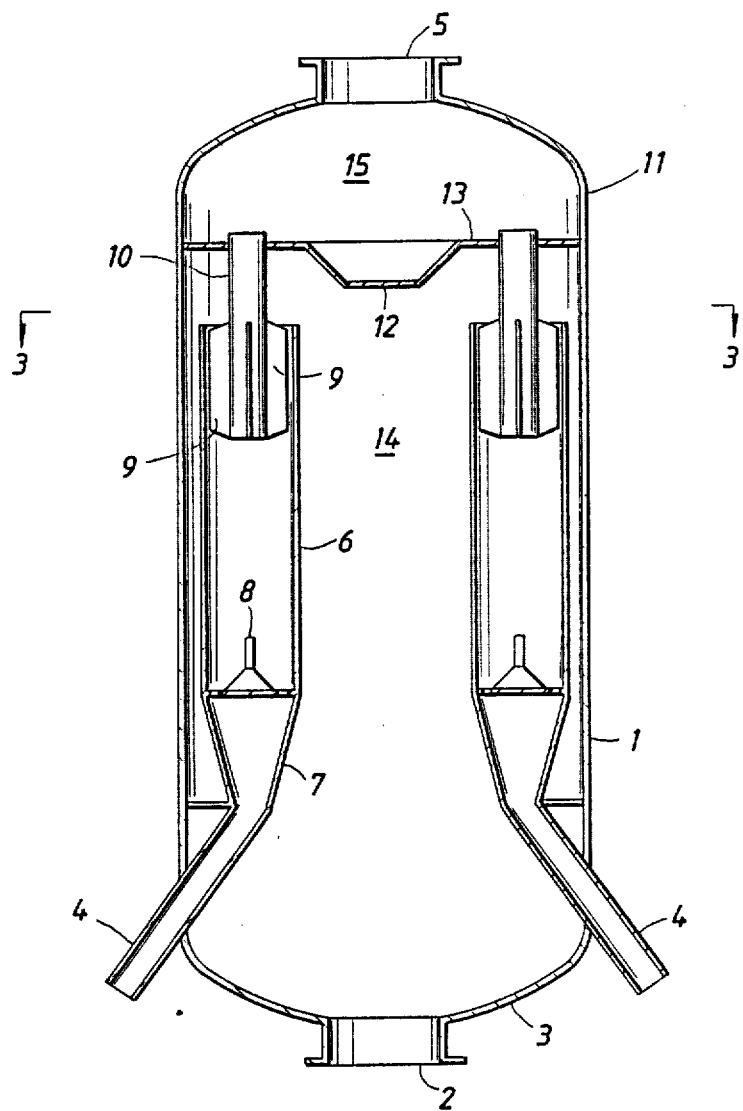
FIG. 1 is a longitudinal cross-sectional view of a fully enclosed individual separating apparatus constructed in accordance with the present invention.

The apparatus depicted in FIG. 1 comprises a housing 1 provided with an inlet 2 for an upwardly flowing mixture of solids and fluid in its bottom section 3, a plurality of separate solids outlets 4 and a combined fluid outlet 5. A number (eight according to FIG. 3) of substantially vertical tubular elements 6 are symmetrically arranged in the housing, preferably in such a manner that they can be easily removed from said housing through outlet 5. The lower sections 7 of the tubular elements 6 are suitably downwardly converging. Preferably, vortex stabilizer means 8 are arranged in the lower sections of the tubular elements 6 in which, during operation, the mixture of solids and fluid is subjected to a helical movement. Swirl imparting means 9 (suitably outwardly curved swirl vanes) are located in the upper sections of said tubular elements, and are preferably attached to tubular fluid outlet means 10 which are arranged substantially coaxially within said upper sections. Alternatively, inwardly extending swirl imparting means can be attached to the upper sections of tubular elements 6.

Preferably, only a small number (e.g. 1, 2 or 3) of tubular elements 6 cooperate with a common solids outlet 4, in order to avoid fluid and/or solids surging effects ("cross-talk") between different tubular elements.

The length:diameter ratio of the tubular elements 6 is suitably from 1-10, and preferably from 2-5. The ratio of the diameters of the tubular elements 6 and the tubular fluid outlet means 10 is suitably from 1.5-4, and preferably from 2-3.

The upper section 11 of the housing 1 is preferably provided with a central downwardly extending fluid deflection means 12 (suitably an inverted truncated cone) arranged in wall 13 separating the space 14 between the tubular elements 6 from fluid collecting space 15. The presence of fluid deflection means can substantially reduced erosion problems which might otherwise arise due to impingement of solids with a relatively high velocity on wall 13 when the upward flow of the solids-fluid feed mixture is reversed before said mixture enters the annular spaces of the tubular elements 6 and the tubular fluid outlet means 10. Moreover, the presence of fluid deflection means 12 will in some cases lead to a reduced pressure drop during operation of the apparatus.

The apparatus according to the present invention advantageously further comprises lower pre-separation means (as depicted in FIG. 2 and FIG. 4) suitable for the separation of larger (e.g. catalyst) particles from fluids. This embodiment is particularly preferred for application in a fluid catalytic cracking process. The lower separation means comprises a domed upper section 16, upwardly directed feed inlet means 17 cooperating substantially tangentially with said domed upper section, a central section 18 provided with outlet means 19 in communication with the space 14 between the tubular elements 6 and the housing, and a solids outlet opening 20 in the lower section 21 of the separation means.

Preferably, the domed upper section 16, the central section 18 and the lower section 21 together form a substantially spherical body having two vertically flattened sides to provide spaces 22 between the central section 18 and the housing 1. Spaces 22 and 14 are in communication with (preferably tubular) outlet means 19. An optimal flow pattern of the solids and fluid streams will be attained in such a substantially spherical body which result in high solids separation efficiency, a relatively short solids residence time (in order to avoid undesired reactions) and a low pressure drop in the apparatus.

Suitably, the lower section 21 comprises at least one fluid ventilation opening 23 which is in communication with space 24 wherein relatively large solid particles separated from fluid during operation of the lower separation means are collected together and then combined with relatively small particles (fines) flowing through solids outlets 4 into said space 24.

Figure 3:
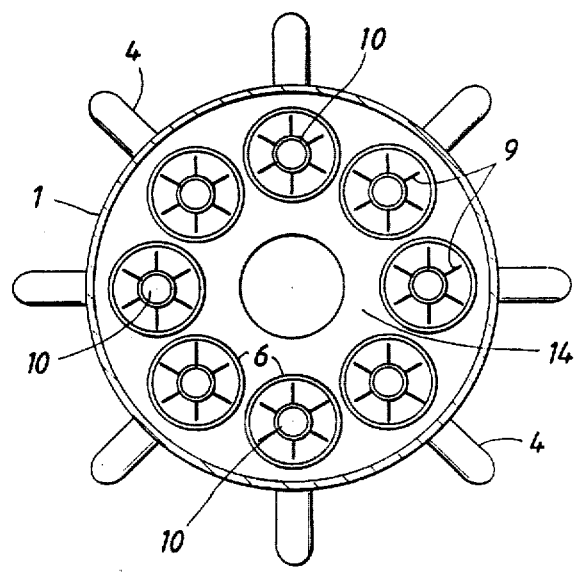
FIG. 3 is a cross sectional view of the integrated apparatus of FIG. 2 taken at line 3—3 of FIG. 1 or 2.

When the apparatus depicted in FIGS. 2-4 is employed in a fluid catalytic cracking process, feed inlet means 17 suitably forms the upper part of a fluid catalytic cracking riser reactor 25, whereas in space 24, stripping of hydrocarbons from cracking catalyst particles may be optionally carried out by means of steam or other stripping gases which are suitably introduced through gas feed means (not shown) into one or more lower sections of the housing 1. Through fluid ventilation opening 23 vapors evolving from (pre-) stripped catalyst particles can flow into the domed separation means.

However, the (pre-) stripper vapors can also be kept separate from the vapors originating from the riser reactor, if desired, by providing a separate vapor outlet for the (pre-) stripper vapors in an apparatus without said opening.

The integrated apparatus according to the invention comprises one or more, preferably substantially horizontal, outlet means 19 for fluid containing some (catalyst) fines, from which the larger particles have been separated. Suitably, the outlet means 19 forms a tube extending through central section 18 and comprising at least one opening 26 preferably located at the lower central part of the tube, in order to avoid entrainment of catalyst particles by hydrocarbon vapors during startup of the catalytic cracking process when the velocity of the catalyst particles in the dome is relatively low.

During normal operation of the apparatus according to the invention the (catalyst) particles follow a flow path in a substantially vertical plane along the inner wall of domed section 16 and leave section 18 through solids outlet opening 20. In order to avoid a flow of solids together with fluid directly from feed inlet means 17 via lower section 21 to solids outlet opening 20, the latter opening is suitably provided with a shim 27 which is preferably inclined at an angle from 15 to 45 degrees with respect to a vertical plane for optimal solids deflection (see in particular FIG. 2).

The ratio of the maximum internal widths of the dome and the feed inlet means 17 is suitably from 1.5-6, and preferably from 2-4.

The invention further relates to a process for separating solid particles from fluid, in particular for separating fluid cracking catalyst particles from gaseous hydrocarbon conversion products. This process includes passing a mixture of solid particles and fluid upwardly into space 14 between tubular elements 6 and subsequently downwardly into annular spaces provided with swirl imparting means 9. The annular spaces are defined between the upper sections of tubular elements 6 and the lower sections of tubular fluid outlet means 10 which are arranged substantially coaxially within said upper sections. Swirl imparting means 9 imparts a helical movement to the solids-fluid mixture (e.g. catalyst fines-containing gases) in tubular elements 6 to separate solids from fluid, removing solids through lower sections 4 of the tubular elements and removing fluid upwardly through the upper sections of tubular fluid outlet means 10.

Preferably, a mixture of solid cracking catalyst particles and hydrocarbon-containing gases emanating from a fluid catalytic cracking zone is pre-separated by passing said mixture upwardly and tangentially into a substantially spherical pre-separation zone, wherein the mixture is subjected to a rotating movement in a substantially vertical plane, removing catalyst particles through opening 20 in the lower section 21 of the pre-separation zone and passing catalyst fines-containing gases from the central section of the pre-separation zone upwardly through space 22 between the tubular elements of the next separation zone.

Apart from gaseous hydrocarbon conversion products, other gases such as flue gases or gases obtained in shale conversion processes and coal- or heavy oil gasification process can also be separated from solid particles in the above-described manner.

Preferably, catalyst particles and/or -fines which have been separated by means of said process are passed to at least one stripping zone which is in gaseous communication with the first and/or second separation zone, and contacted in the stripping zone(s) with a stripping gas (e.g. steam).

Moreover, the invention relates to hydrocarbon conversion products separated by a process as described hereinbefore.

The invention will be further elucidated by means of the following Example.

EXAMPLE

A feed stream of hydrocarbon vapors and cracking catalyst particles in a weight ratio of 40 enters feed inlet 2 of a separation apparatus as depicted in FIG. 1 at a temperature of 520° C., a pressure of 2 bar gauge and a vapor velocity of 6 m/s. Catalyst particles are removed through solids outlets 4 with a separation efficiency of more than 95% on a weight basis.

Various modifications of the inventio will become apparent to those skilled in the art from the foregoing description and the accompanying drawings. Such modifications are specifically intended to fall within the scope of the appended claims.

What is claimed is:

1. A process for separating solid particles from fluid which comprises passing a mixture of solid particles and fluid upwardly into a space exterior to and between tubular elements and subsequently downwardly entering into annular spaces provided with swirl imparting means interior to the tubular elements, which annular spaces are defined between the upper sections of the tubular elements and the lower sections of tubular fluid outlet means arranged substantially coaxially within said upper sections, imparting a helical movement to the solids-fluid mixture in the tubular elements to separate solids from fluid, removing solids through the lower sections of the tubular elements and removing fluid upwardly through the upper sections of the tubular fluid outlet means.

2. A process according to claim 1 wherein fluid cracking catalyst particles are separated from gaseous hydrocarbon conversion products.

3. A process according to claim 2 wherein a mixture of solid cracking catalyst particles and hydrocarbon-containing gases emanating from a fluid catalytic cracking zone is pre-separated by passing said mixture upwardly and tangentially into a substantially spherical pre-separation zone wherein the mixture is subjected to a rotating movement in a substantially vertical plane, removing catalyst particles through an opening in the lower section of the pre-separation zone and passing catalyst fines-containing gases from the central section of the pre-separation zone upwardly through the space between the tubular elements of the next separation zone.

4. A process for separating solid particles from fluid comprising the following steps:
passing a mixture of the solid particles and the fluid upwardly through an inlet substantially centered at the bottom of a housing into a space between a plurality of circumferentially arranged vertical tubular elements within the housing;
deflecting the mixture against a fluid deflector which extends downwardly from a position substantially centered at the upper section of the housing for openly distributing the flow of the mixture evenly above the entrances to a plurality of annular spaces defined within the tubular elements;
subsequently passing the mixture downwardly into the annular spaces which are provided with swirl imparting means between the upper sections of the tubular elements and the lower section of tubular fluid outlet means arranged substantially coaxially within the upper sections of the tubular elements;
imparting a helical movement to the solids-fluid mixture in the tubular elements to separate solids from fluid;
removing solids from the housing through the lower sections of the tubular elements; and
removing fluid from the housing upwardly through the upper sections of the tubular fluid outlet means.

5. A process according to claim 4 wherein the solid particles are fluid cracking catalyst particles and the fluid is gaseous hydrocarbon conversion products.

6. A process according to claim 5 wherein the mixture of the cracking catalyst particles and gaseous hydrocarbon conversion products emanate from a fluid catalytic cracking zone, the process further comprising a pre-separation step comprising:
passing said mixture upwardly and tangentially into a substantially spherical pre-separation zone;
subjecting the mixture to a rotating movement in a substantially vertical plane;
removing catalyst particles through an opening in the lower section of the pre-separation zone; and
passing catalyst fines-containing gases from the central section of the pre-separation zone upwardly through the space between the tubular elements of the next separation zone.

* * * * *